United States Patent
Messelling et al.

(10) Patent No.: US 6,464,128 B1
(45) Date of Patent: Oct. 15, 2002

(54) BRAZE REPAIR OF A GAS TURBINE ENGINE STATIONARY SHROUD

(75) Inventors: William Gerald Messelling, Mason; David Edwin Budinger, Loveland, both of OH (US)

(73) Assignee: General Electric Company, Schenectady, NY (US)

(*) Notice: Subject to any disclaimer, the term of this patent is extended or adjusted under 35 U.S.C. 154(b) by 8 days.

(21) Appl. No.: 09/687,422

(22) Filed: Oct. 13, 2000

Related U.S. Application Data

(63) Continuation-in-part of application No. 09/322,008, filed on May 28, 1999, now Pat. No. 6,283,356.

(51) Int. Cl.⁷ .......................... B23K 31/00; B23P 6/00; B22D 19/10
(52) U.S. Cl. ........................ 228/119; 29/889.1; 164/92.1
(58) Field of Search .................. 228/119, 226, 228/245, 248.1, 248.5, 246; 29/889.1, 889, 889.6, 889.7, 889.71, 530; 164/92.1, 80

(56) References Cited

U.S. PATENT DOCUMENTS

| | | | | |
|---|---|---|---|---|
| 4,400,915 A | * | 8/1983 | Arrigoni | 29/889.1 |
| 4,589,175 A | * | 5/1986 | Arrigoni | 29/402.18 |
| 5,048,183 A | * | 9/1991 | Cang et al. | 228/119 |
| 5,523,170 A | * | 6/1996 | Budinger et al. | 419/54 |
| 5,561,827 A | * | 10/1996 | Reeves et al. | 419/10 |
| 5,628,814 A | * | 5/1997 | Reeves et al. | 420/443 |
| 5,705,281 A | * | 1/1998 | Reeves et al. | 428/548 |
| 6,233,822 B1 | * | 5/2001 | Grossklaus et al. | 29/402.01 |
| 6,283,356 B1 | * | 9/2001 | Messelling | 164/92.1 |
| 6,302,649 B1 | * | 10/2001 | Mukira et al. | 148/428 |

* cited by examiner

Primary Examiner—Tom Dunn
Assistant Examiner—Zidia Pittman
(74) Attorney, Agent, or Firm—David L. Narciso; Gregory O. Garmong

(57) ABSTRACT

An undersize repair region of a gas turbine engine stationary shroud is repaired with a sufficient mass of a repair material. The repair material includes a first fraction of a first powder of a first alloy component, and a second fraction of a second powder of a second alloy component. The first alloy component and the second alloy component have different solidus temperatures. The repair material is placed in the repair region. The repair material and the repair region are heated to melt the repair material but not the repair region, and thereafter the repair material and the repair region are cooled to solidify the repair material.

20 Claims, 3 Drawing Sheets

BRAZE REPAIR OF A GAS TURBINE ENGINE STATIONARY SHROUD

This application is a continuation-in-part of application Ser. No. 09/322,008, filed May 28, 1999, now U.S. Pat. No. 6,283,356.

FIELD OF THE INVENTION

This invention relates to gas turbine engines and, more particularly, to the repair of stationary shrouds found in gas turbine engines.

BACKGROUND OF THE INVENTION

In an aircraft gas turbine (jet) engine, air is drawn into the front of the engine, compressed by a shaft-mounted compressor, and mixed with fuel. The mixture is burned, and the hot combustion gases are passed through a turbine mounted on the same shaft. The flow of combustion gas turns the turbine by impingement against an airfoil section of the turbine blades and vanes, which turns the shaft and provides power to the compressor. The hot exhaust gases flow from the back of the engine, driving it and the aircraft forwardly.

The turbine blades are mounted on a turbine disk, which rotates on a shaft inside a generally cylindrical tunnel defined by a hollow stationary shroud structure. The stationary shroud structure is formed of a series of stationary shrouds that extend around the circumference of the tunnel in an end-to-end fashion. The stationary shroud structure has such a segmented arrangement to accommodate the thermal expansion experienced during each engine cycle as the stationary shroud structure is cycled between room temperature and a maximum service temperature of over 2000° F. Each of the stationary shrouds has an internal gas path surface that is a segment of a cylinder, and a support structure that backs the gas path surface and provides for attachment to the adjacent structure.

During service, the support structure of the shrouds may be damaged by fatigue, erosion, and other mechanisms. One form of the damage is the wearing away of material from the shrouds, at locations such as the end faces, the forward and aft edges, and elsewhere. As material is worn away and during multiple repair cycles when material is removed by machining operations, the shroud gradually becomes undersize in at least one dimension of the support structure. When the shroud has become too small in at least one dimension of the support structure to continue to be functional, it is discarded.

There is a need for an improved approach to responding to such damage to gas turbine engine shrouds. The shrouds are made of expensive nickel-base or cobalt-base superalloys, and the discarding of a shroud represents a substantial cost. The present invention fulfills this need, and further provides related advantages.

BRIEF SUMMARY OF THE INVENTION

The present invention provides a method of repairing a gas turbine engine stationary shroud. The repair may be performed on any portions of the support structure. It is preferably performed on the end faces which butt against the end faces of the neighboring shrouds in service and gradually become undersized. The repaired shroud is fully functional and is serviceable at a small fraction of the cost of a new shroud.

A method of repairing a gas turbine engine stationary shroud comprises the steps of providing the gas turbine engine stationary shroud having an undersize repair region made of a shroud material, wherein the repair region is not located on a gas flow path surface of the gas turbine engine stationary shroud. The repair region may be, for example, an end face, an edge, or a back surface of the gas turbine engine stationary shroud. The repair region of the gas turbine engine stationary shroud is repaired so that the repair region is no longer undersize. The step of repairing includes the steps of providing a sufficient mass of a repair material comprising a first fraction of a first powder of a first alloy component, and a second fraction of a second powder of a second alloy component. The first alloy component and the second alloy component have different solidus temperatures. Each of the two powders is preferably prealloyed, so that its constituents are melted together prior to the two powder types being mixed together. The step of repairing further includes placing the repair material in the repair region, heating the repair material and the repair region to a brazing temperature sufficient to melt the repair material but not the shroud material of the repair region, so that the repair material flows over the repair region, and thereafter cooling the melted repair material and the repair region to solidify the repair material, the repair material having a solidus temperature less than that of the shroud material.

The shroud material may be a cobalt-base superalloy or a nickel-base superalloy, and the repair material is selected accordingly. The first powder and the second powder that form the repair material may be provided as free-flowing powders, or they may first be mixed and sintered together to form a pre-sintered compact. The use of the pre-sintered compact is preferred for standard repair locations, such as for use at the end faces.

The present approach achieves a fully serviceable repaired shroud, reducing the number of shrouds that are discarded. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
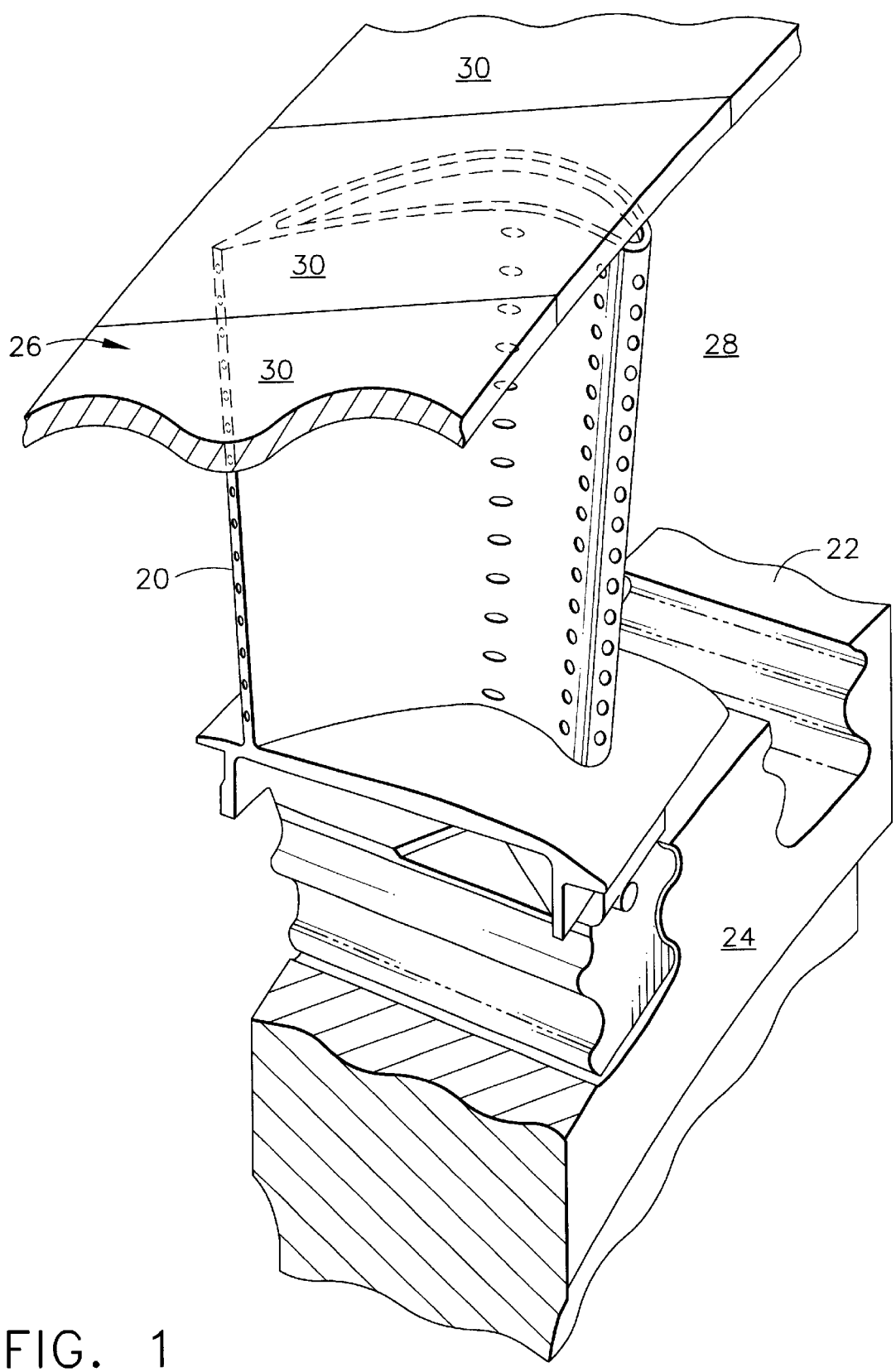
FIG. 1 is a perspective view of a turbine blade positioned adjacent to a shroud structure.

FIG. 1 depicts a turbine blade 20 mounted to a periphery 22 of a turbine disk 24. There are a large number of turbine blades 20 mounted in this fashion to the turbine disk 24, but only one is illustrated. The turbine disk 24 rotates on a turbine shaft (not shown) positioned along its centerline. As the turbine disk 24 rotates, the turbine blade 20 sweeps through an annular volume between the turbine disk 24 and a stationary shroud structure 26, a portion of the circumference of which is shown schematically in FIG. 1 and in more detail in FIG. 2. The shroud structure 26 in its entirety defines a tunnel 28 in which the turbine disk 24, turbine shaft, and turbine blades 20 rotate. Hot combustion gases flow from a combustor (not shown) through the annular volume of the tunnel 28 between the periphery 22 of the turbine disk 24 and the shroud structure 26, impinging against the turbine blades 20 and causing the turbine disk 24 and the shaft to turn.

The shroud structure 26 is formed of a number of individual shrouds 30 positioned in an end-to-end arrangement around the circumference of the tunnel 28. One of the shrouds 30 is shown in greater detail in FIG. 2. The shroud 30 has a gas flow path surface 32 (the underside of the shroud 30 in the view of FIG. 2) which faces the turbine blade 20.

A support structure 34 forms the back side of the shroud remote from the gas flow path surface 32. The support structure 34 includes oppositely disposed end faces 36 that abut the end faces of the adjoining shrouds 30, and oppositely disposed forward edge 38 and aft edge 40. Additional structural features, whose details and functions are not pertinent to the present invention, include a forward groove 42, an aft groove 44, a race track 46, casting ribs 48, and a back surface 50.

During service, one or more of the features of the support structure 34 may become damaged by removal of metal, so that it becomes undersized. Initially, some such damage is acceptable, but eventually the feature becomes so far below its desired specified service minimum dimension that it is no longer functional. In the past, it has been the practice to discard the entire shroud at this point. The present invention provides a repair technique for the support structure 34 of the shroud 30 so that it may be removed from the engine, repaired, and then returned to service.

Figure 2:
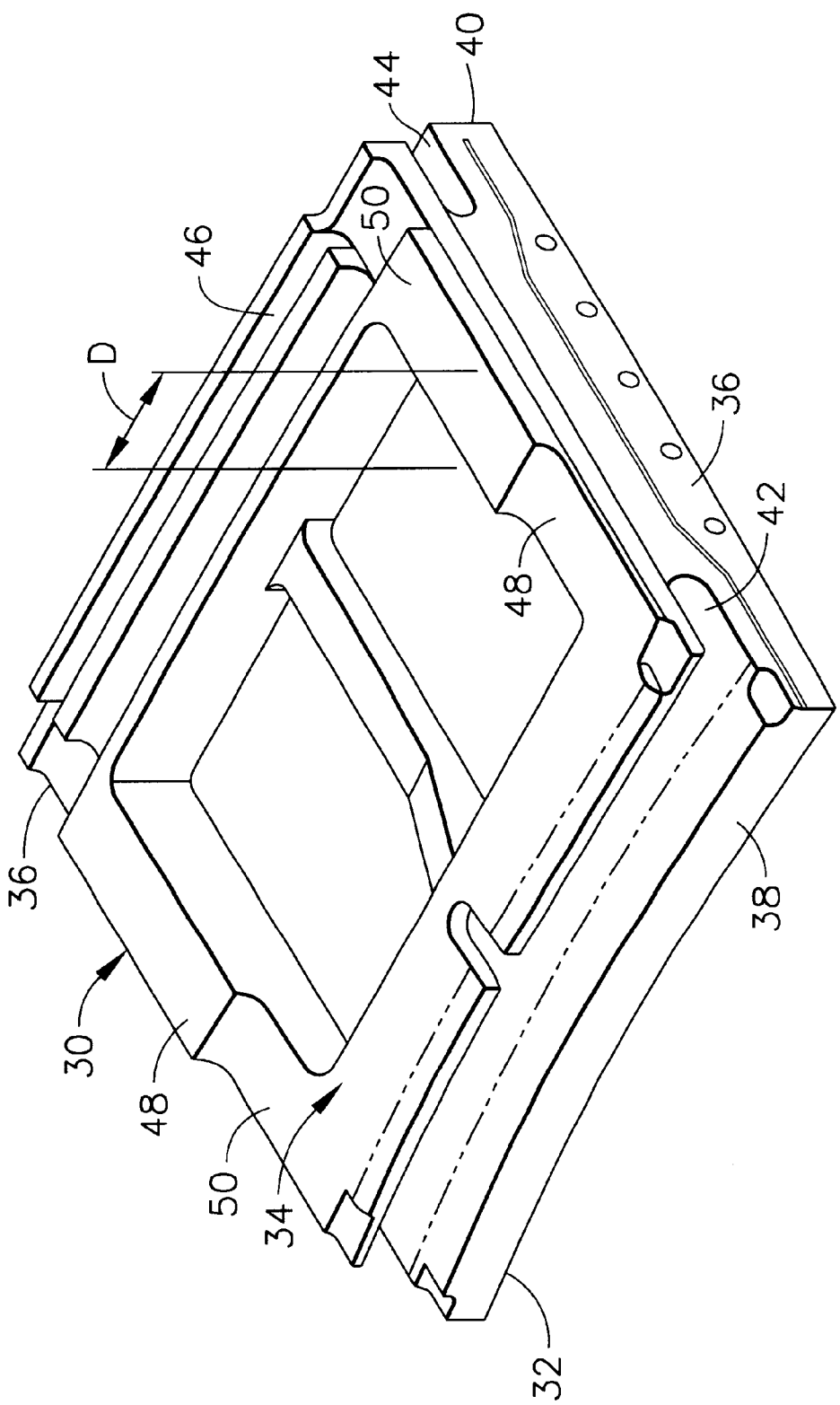
FIG. 2 is a perspective view of a single shroud from the support structure side.
Figure 3:
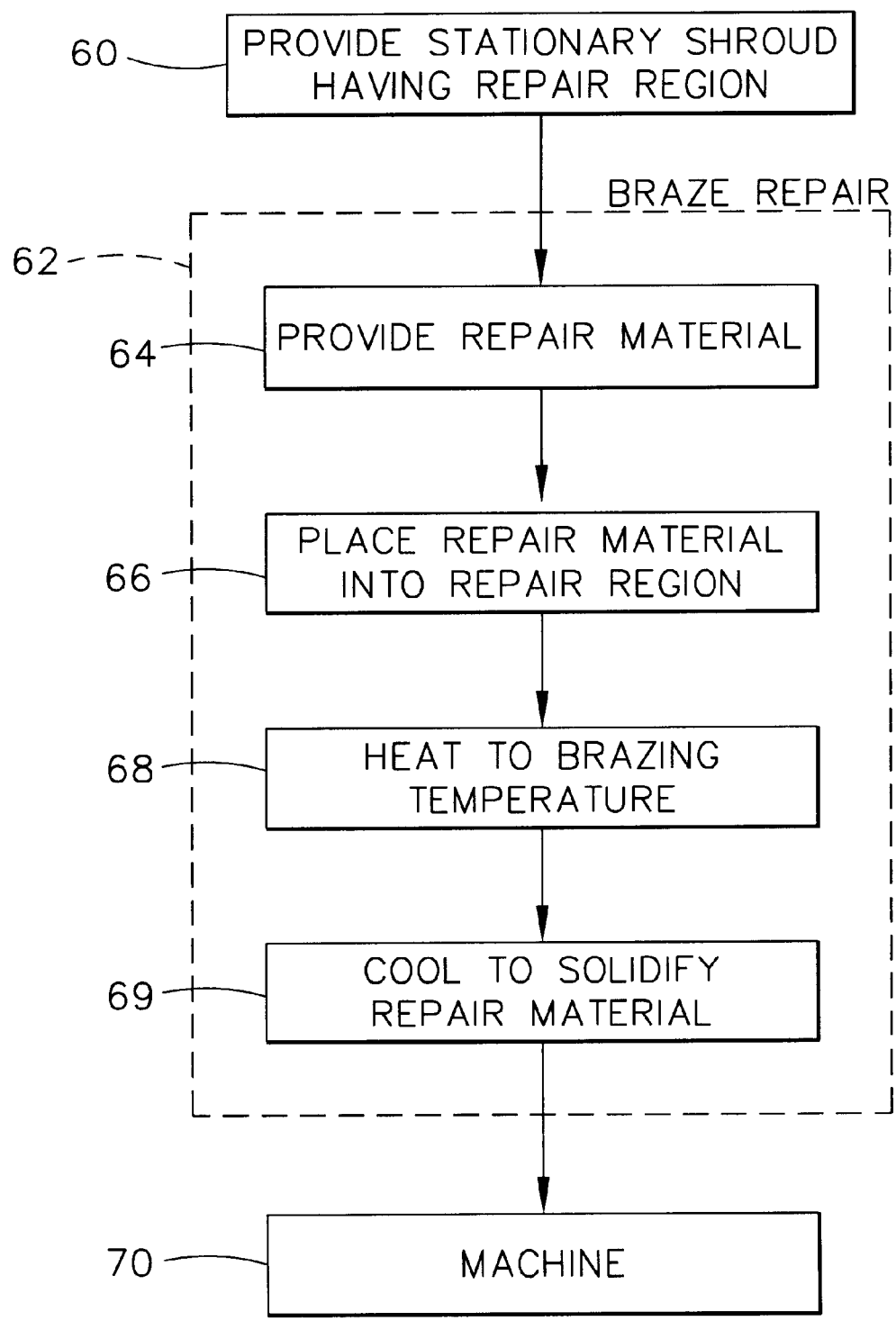
FIG. 3 is a block flow diagram of a method for repairing the shroud.

FIG. 3 illustrates a preferred method for performing the repair. A gas turbine engine stationary shroud 30 is provided, numeral 60. The shroud 30 has a repair region which is undersize. That is, some dimension of the shroud 30 is less than a specified service minimum dimension. The current repair region of most concern, which will be discussed in detail for the sake of definiteness, is loss of material from the end faces 36 that abut the end faces of the neighboring shrouds. As illustrated in FIG. 2, a specified service minimum dimension D, the width of the casting rib 48, is indicative of the total chord length of the shroud 30 between the oppositely disposed end faces 36. If D is too small, the shroud 30 will be too short in the circumferential direction and will not fit together properly with the adjacent shrouds, allowing turbine gas leakage between the shrouds and a resulting decrease in operating efficiency.

The shroud 30 and its repair region, in this case the repair region 36, are repaired by a technique involving activated diffusion healing braze repair, numeral 62. A repair material is provided, numeral 64. The repair material is a sufficient mass of a first fraction of a first powder of a first alloy component, and a second fraction of a second powder of a second alloy component, to restore the repair region back to its desired dimension. The first alloy component and the second alloy component have different solidus temperatures. The repair material that is later formed as a melted mixture of the first powder and the second powder has a solidus temperature less than that of a shroud material that forms the repair region.

The first powder and the second powder are selected according to the shroud material that forms the repair region. The powders selected for cobalt-base shroud materials are different from those selected for nickel-base shroud materials. In a case of particular interest, the shroud material is a cobalt-base alloy known as Mar M509, which has a nominal composition, in weight percent, comprising about 23.5 percent chromium, about 10 weight percent nickel, about 7 percent tungsten, about 3.5 percent tantalum, about 0.2 percent titanium, about 0.4 percent zirconium, about 0.6 percent carbon, no more than about 2 percent iron, balance cobalt and impurities.

For the cobalt-base shroud material, the first alloy component preferably comprises a prealloyed composition, in weight percent, of from about 10 to about 25 percent nickel, from about 15 to about 25 percent chromium, from about 5 to about 10 percent silicon, from about 2 to about 6 percent tungsten, from about 0.2 to about 0.8 percent carbon, from about 0.4 to about 2.0 percent boron, balance cobalt and impurities. The second alloy component preferably comprises a prealloyed composition, in weight percent of from about 5 to about 15 percent nickel, from about 15 to about 30 percent chromium, about 2.0 percent maximum silicon, from about 5 to about 10 percent tungsten, from about 0.3 to about 0.8 percent carbon, about 1.5 percent maximum manganese, about 3 percent maximum iron, about 0.5 percent maximum zirconium, balance cobalt and impurities. The first fraction is preferably from about 25 weight percent to about 50 weight percent, most preferably about 35 weight percent. The second fraction is preferably from about 75 weight percent to about 50 weight percent, most preferably about 65 weight percent.

On the other hand, the shroud material may be a nickel-base superalloy such as Rene N5, which has a nominal composition, in weight percent, of from about 6 to about 6.4 percent aluminum, from about 6.75 to about 7.25 percent chromium, from about 7 to about 8 percent cobalt, from about 0.12 to about 0.18 percent hafnium, from about 1.3 to about 1.7 percent molybdenum, from about 2.75 to about 3.25 percent rhenium, from about 6.3 to about 6.7 percent tantalum, from about 4.75 to about 5.25 percent tungsten, a sum of aluminum plus tantalum about 12.45 percent minimum, balance nickel and impurities. Where the shroud material is a nickel-base superalloy such as Rene N5, the first alloy component preferably comprises a prealloyed composition, in weight percent, of from about 10 to about 20 percent cobalt, from about 14 to about 25 percent chromium, from about 2 to about 12 percent aluminum, from 0 to about 0.2 percent yttrium, balance nickel and impurities. The second alloy component preferably comprises a prealloyed composition, in weight percent of from about 10 to about 20 percent cobalt, from about 14 to about 25 percent chromium, from about 2 to about 12 percent aluminum, from about 2 to about 12 percent silicon, balance nickel and impurities. The first fraction is preferably from about 55 to about 80 weight percent, most preferably about 68.5 weight percent. The second fraction is preferably from about 45 weight percent to about 20 weight percent, most preferably about 31.5 weight percent.

The two types of individually prealloyed powders may be provided in a loose, free-flowing form. They may instead be provided as a pre-sintered compact. Both approaches are operable, although the use of the pre-sintered compact is more practical for production operations. In this latter approach, the powders are mixed together, pressed with a binder into a desired shape, and sintered by heating to a temperature where the powders sinter but do not both melt. It is not necessary that the pre-sintered compact have a high relative density (that is, little porosity), as it is later melted. The pre-sintered compact is more easily handled and positioned than are the free-flowing powders, and there is less compaction and shrinkage in subsequent melting. A combination of these approaches may be desired. For example, the pre-sintered compact may be contacted to the end face 36, and free-flowing powders may be packed into the adjacent portions of the grooves 42 and 44.

The repair material is placed into the repair region, numeral 66. The repair material may be the mixture of the free-flowing powders, the pre-sintered compact, or a combination of both approaches. The amount of repair material is selected so that, after subsequent melting and machining, the repair region is restored to its desired dimension.

The repair material and the repair region are heated to a brazing temperature to melt at least a portion of the repair material but not the shroud material of the repair region, numeral 68. In the case of the above-discussed repair materials for the cobalt-base alloys and the nickel-base alloys, the brazing temperature is from about 2190° F. to about 2335° F., preferably from about 2300° F. to about 2325° F. At the brazing temperature, the powder having the lower solidus temperature melts to accelerate the bonding to the shroud and the densification process, while the powder having the higher solidus temperature remains solid so that the powder mass generally retains its shape.

After a short time at the brazing temperature, typically on the order of about 20 minutes to about 2 hours, preferably about 2 hours, the melted repair material and the repair region are cooled below the solidus temperature of the melted repair material to solidify the repair material, numeral 68. The repair material solidifies bonded to the shroud. The result is a shroud 30 in which the repair region is no longer undersize.

In most cases, the amount of repair material is selected so that the repair region will be oversize after the brazing and cooling steps. Although it would be desirable to make the repair exactly the right size after brazing and cooling, it is typically not possible to control the amount and distribution of the repair metal that precisely. Accordingly, the repair region is made oversize, and then machined, numeral 70, to the correct size and with the necessary details such as the grooves 42 and 44.

The present invention has been reduced to practice. A total of 400–500 shrouds 30 made of Mar M509 material were repaired on their end faces to restore their proper chord lengths. Repaired shrouds were tested by oxidation testing at 2050° F. for 23 hours, and by furnace cycle testing between room temperature and 2000° F. for 200 cycles. The performance of the repaired shrouds was equivalent to that of the original Mar M509 substrate material.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method of repairing a gas turbine engine stationary shroud, comprising the steps of
    providing the gas turbine engine stationary shroud having an undersize repair region made of a shroud material, wherein the repair region is not located on a gas flow path surface of the gas turbine engine stationary shroud;
    repairing the repair region of the gas turbine engine stationary shroud so that the repair region is no longer undersize, the step of repairing including the steps of
        providing a sufficient mass of a repair material comprising
            a first fraction of a first powder of a first alloy component, and
            a second fraction of a second powder of a second alloy component,
            wherein the first alloy component and the second alloy component have different solidus temperatures,
        placing the repair material into the repair region,
        heating the repair material and the repair region to a brazing temperature sufficient to melt at least a portion of the repair material but not the shroud material of the repair region, so that the repair material flows over the repair region, and thereafter
        cooling the melted repair material and the repair region to solidify the repair material, the repair material having a solidus temperature less than that of the shroud material.

2. The method of claim 1, wherein the step of providing the gas turbine engine stationary shroud includes the step of providing the repair region having a dimension less than a specified service minimum dimension.

3. The method of claim 1, wherein the step of providing a gas turbine engine stationary shroud includes the step of providing a gas turbine engine stationary shroud made of a shroud material comprising a cobalt-base alloy.

4. The method of claim 3, wherein the cobalt base alloy has a composition, in weight percent, comprising about 23.5 percent chromium, about 10 weight percent nickel, about 7 percent tungsten, about 3.5 percent tantalum, about 0.2 percent titanium, about 0.4 percent zirconium, about 0.6 percent carbon, no more than about 2 percent iron, balance cobalt and impurities.

5. The method of claim 3, wherein
    the first alloy component comprises a prealloyed composition, in weight percent, of from about 10 to about 25 percent nickel, from about 15 to about 25 percent chromium, from about 5 to about 10 percent silicon, from about 2 to about 6 percent tungsten, from about 0.2 to about 0.8 percent carbon, from about 0.4 to about 2.0 percent boron, balance cobalt and impurities, and
    the second alloy component comprises a prealloyed composition, in weight percent of from about 5 to about 15 percent nickel, from about 15 to about 30 percent chromium, about 2.0 percent maximum silicon, from about 5 to about 10 percent tungsten, from about 0.3 to about 0.8 percent carbon, about 1.5 percent maximum manganese, about 3 percent maximum iron, about 0.5 percent maximum zirconium, balance cobalt and impurities.

6. The method of claim 5, wherein the first fraction is from about 25 weight percent to about 50 weight percent, and the second fraction is from about 75 weight percent to about 50 weight percent.

7. The method of claim 1, wherein the step of providing a gas turbine engine stationary shroud includes the step of providing a gas turbine engine stationary shroud made of a shroud material comprising a nickel-base superalloy.

8. The method of claim 7, wherein
    the first alloy component comprises a prealloyed composition, in weight percent, of from about 10 to about 20 percent cobalt, from about 14 to about 25 percent chromium, from about 2 to about 12 percent aluminum, from 0 to about 0.2 percent yttrium, balance nickel and impurities, and
    the second alloy component comprises a prealloyed composition, in weight percent of from about 10 to about 20 percent cobalt, from about 14 to about 25 percent chromium, from about 2 to about 12 percent aluminum, from about 2 to about 12 percent silicon, balance nickel and impurities.

9. The method of claim 8, wherein the first fraction is from about 55 to about 80 weight percent, and the second fraction is from about 45 weight percent to about 20 weight percent.

10. The method of claim 1, wherein the repair region is an end face of the gas turbine engine stationary shroud.

11. The method of claim 1, wherein the repair region is an edge of the gas turbine engine stationary shroud.

12. The method of claim 1, wherein the repair region is a back surface of the gas turbine engine stationary shroud.

13. The method of claim 1, wherein the step of providing a sufficient mass includes the step of providing the first powder and the second powder as free-flowing powders.

14. The method of claim 1, wherein the step of providing a sufficient mass includes the step of providing the first powder and the second powder as a pre-sintered compact.

15. A shroud repaired according to the method of claim 1.

16. A method of repairing an article forming a portion of a flow path surface in a gas turbine engine, the article previously exposed to high temperature operation in the gas turbine engine, the method comprising the steps of:

identifying an undersize dimension of the article, the undersize dimension being less than a specified minimum service dimension and the undersize dimension being defined at least in part by a non flow path surface of the article;

providing a repair material comprising a first fraction of a first powder of an alloy component and a second fraction of a second powder of a second alloy component, the first alloy component and the second alloy component having different solidus temperatures, wherein the repair material has a solidus temperature less than that of an article material;

associating the repair material with the non flow path surface of the article;

heating the repair material and the article to a brazing temperature sufficient to melt at least a portion of the repair material but not the article; and cooling the melted repair material and the repair region to solidify the repair material, the repair material having a solidus temperature less than that of the shroud material, the solidified repair material increasing the undersize dimension.

17. The method of claim 16, wherein the article comprises a stationary component of a gas turbine engine, and wherein the undersize dimension of the article comprises a chord length.

18. The method of claim 16 wherein the non flow path surface is an end face of a gas turbine engine stationary shroud.

19. The method of claim 16, wherein the first alloy component comprises a prealloyed composition, in weight percent, of from about 10 to about 20 percent cobalt, from about 14 to about 25 percent chromium, from about 2 to about 12 percent aluminum, from 0 to about 0.2 percent yttrium, balance nickel and impurities, and the second alloy component comprises a prealloyed composition, in weight percent of from about 10 to about 20 percent cobalt, from about 14 to about 25 percent chromium, from about 2 to about 12 percent aluminum, from about 2 to about 12 percent silicon, balance nickel and impurities.

20. The method of claim 16, wherein the first fraction is from about 55 to about 80 weight percent, and the second fraction is from about 45 weight percent to about 20 weight percent.

* * * * *